United States Patent
Liu (10) Patent No.: US 8,018,934 B2
(45) Date of Patent: Sep. 13, 2011

(54) SWITCHED UNICAST IN AN INTERNET PROTOCOL TELEVISION ENVIRONMENT

(75) Inventor: Xiaomei Liu, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 251 days.

(21) Appl. No.: 12/408,335

(22) Filed: Mar. 20, 2009

(65) Prior Publication Data

US 2010/0238924 A1 Sep. 23, 2010

(51) Int. Cl.
*H04L 12/56* (2006.01)
*H04J 3/16* (2006.01)

(52) U.S. Cl. .................................. 370/390; 370/466
(58) Field of Classification Search .............. 370/390, 370/432, 465–467, 498, 473, 474; 725/32–36, 725/86
See application file for complete search history.

(56) References Cited

U.S. PATENT DOCUMENTS

| | | | |
|---|---|---|---|
| 6,993,081 B1 * | 1/2006 | Brunheroto et al. | 375/240.28 |
| 7,031,326 B1 * | 4/2006 | Shur et al. | 370/401 |
| 7,260,070 B1 * | 8/2007 | Smith | 370/328 |
| 2003/0046706 A1 * | 3/2003 | Rakib | 725/111 |
| 2005/0083954 A1 * | 4/2005 | Meyer-Grafe | 370/403 |
| 2005/0187960 A1 * | 8/2005 | Nomura | 707/101 |
| 2008/0075077 A1 * | 3/2008 | Roy et al. | 370/390 |
| 2008/0137682 A1 * | 6/2008 | Kish et al. | 370/432 |
| 2009/0003432 A1 | 1/2009 | Liu et al. | |
| 2009/0119722 A1 | 5/2009 | VerSteeg et al. | |
| 2009/0217328 A1 * | 8/2009 | Colmagro et al. | 725/91 |
| 2009/0257432 A1 * | 10/2009 | Yamaguchi et al. | 370/390 |
| 2010/0177773 A1 * | 7/2010 | Kolhi et al. | 370/390 |
| 2010/0182944 A1 * | 7/2010 | Kish | 370/312 |

OTHER PUBLICATIONS

Frost, Victor, S., "Media Access Control #9," Dan F. Servey Distinguished Professor, Electrical Engineering and Computer Science, University of Kansas; retrieved from internet Jan. 29, 2009; http://www.ittc.ku.edu/.
"Cable Modems," The International Engineering Consortium, Web Proforum Tutorials, http://www.iec.org, pp. 1-16., retrieved from internet Jan. 30, 2009.
Colangelo, Gina, "Cable Modems: Theory of Operation," EE194-SDR, Apr. 3, 2006.
"Technical Seminars Introduction to DOCSIS," NextGen Datacom, Inc. 2007.
Data Over Cable Interface Specifications, Cable Modem Termination System—Network Side Interface Specification, SP-CMTS-NSII01-960702; Arthur D. Little, Inc., MCNS Holdings, L.P, 1996.
Cable Modem Termination System, Regional Cable Headend CMTS; Chapter 14, pp. 111-122.

* cited by examiner

*Primary Examiner* — Ayaz R Sheikh
*Assistant Examiner* — Mounir Moutaouakil
(74) *Attorney, Agent, or Firm* — Edell, Shapiro & Finnan, LLC (57) ABSTRACT

In one embodiment, a processing device is coupled between at least one content source and at least one subscriber device within an Internet Protocol television (IPTV) system in order to receive a plurality of service flows from the at least one content source and to process multicast service flow requests from the at least one subscriber device. The processing device includes a map module to map a service flow from a content source to a multicast service flow based on a multicast service flow request from a particular subscriber device and a unicast module to assign a unique identifier to the mapped multicast service flow to convert the mapped multicast service flow to a unicast delivery of the mapped multicast service flow to the particular subscriber device.

20 Claims, 4 Drawing Sheets

SWITCHED UNICAST IN AN INTERNET PROTOCOL TELEVISION ENVIRONMENT

TECHNICAL FIELD

The present disclosure relates generally to switched unicast in an Internet Protocol television environment (IPTV). This may be utilized, for example, to perform targeted advertisement in a cable television system.

BACKGROUND

Digital video can be delivered in either a broadcast mode, a switched mode, or in an on-demand mode. In broadcast mode, all channels are broadcasted from a source (e.g., a cable television system hub) to all the subscribers connected to that hub (e.g., a service group). Broadcast delivery broadcasts all channels all the time, even when a channel has no active viewers. As the number of channels being broadcast increases, bandwidth demands placed on the cable television system also increase. On-demand delivery occupies bandwidth only while the viewer demands the video, and is a type of unicast delivery (i.e., to a single destination) of video assets. Switched digital video offers improved bandwidth utilization by delivering channels with active viewers. Switched digital video (in a non-IPTV environment) can be either switched unicast or switched multicast (i.e., any subscriber can access the channel being broadcast and in that sense the video is delivered to multiple subscribers). Switched multicast provides the best bandwidth efficiency by not duplicating channels, while switched unicast offers the ability to personalize content and advertisement. Targeted advertisement in a switched video delivery can either be based on geographic/demographic zones or based on individual subscribers.

In a traditional (non-IPTV) switched digital environment (Motion Picture Experts Group (MPEG) video delivery), there are several major components: a switched digital video session manager; an edge quadrature amplitude modulator; a video source; and a set top box switched client. When a user selects a channel, the set top box switched client signals the switched digital video session manager of the selected channel and the service group the set top box belongs to. If the channel is already delivered to the service group, the switched digital video session manager simply returns the tuning information to the set top box switched client. Otherwise, the switched digital video session manager will instruct the edge quadrature amplitude modulator to deliver the selected channel to the service group. The edge quadrature amplitude modulator then joins the multicast video source and delivers the video to the service group.

Policy control may be added in the switched digital video session manager to facilitate selection of targeted content (e.g., targeted advertisement). Based on current bandwidth utilization of the service group, the switched digital video session manager decides if a zone based multicast version or a unicast version of a channel should be used. If a zone based multicast version is used, the switched digital video session manager instructs the edge quadrature amplitude modulator to join the multicast group assigned to that the channel. If a unicast version is used, the switched digital video session manager instructs the video source to deliver the unicast version to the edge quadrature amplitude modulator and the edge quadrature amplitude modulator will then deliver the channel to the set top box switched client.

In traditional (non-IPTV) MPEG transport stream video delivery, switched multicast provides the same copy of the stream to be shared among all viewers in a service group by associating a channel (e.g., Cable Network News (CNN)) to a frequency and program number pair. However, in switched unicast, multiple copies of the stream (e.g., CNN) would be transported over different frequency and program number pairs. Each subscriber is assigned a unique frequency and program number pair and tunes to a personalized copy of the stream (e.g., CNN).

BRIEF DESCRIPTION OF THE DRAWINGS

The features and advantages of switched unicast in an Internet Protocol television (IPTV) environment of the present disclosure will become apparent upon consideration of the following description of example embodiments thereof, particularly when taken in conjunction with the accompanying drawings wherein like reference numerals in the various figures are utilized to designate like components.

DESCRIPTION OF EXAMPLE EMBODIMENTS

Overview

An embodiment of the present invention includes a processing device coupled between at least one content source and at least one subscriber device within an Internet Protocol television (IPTV) system in order to receive a plurality of service flows from the at least one content source and to process multicast service flow requests from the at least one subscriber device. The processing device includes a map module to map a service flow from a content source to a multicast service flow based on a multicast service flow request from a particular subscriber device and a unicast module to assign a unique identifier to the mapped multicast service flow to convert the mapped multicast service flow to a unicast delivery of the mapped multicast service flow to the particular subscriber device. Other embodiments include a method and logic encoded in one or more tangible media to deliver a unicast stream via the mapped multicast service flow within the IPTV system.

Example Embodiments

Although conventional (non-IPTV) switched digital video allows for both switched multicast and switched unicast modes, Internet Protocol television services currently allow only a multicast equivalent. This is true because in Internet Protocol television, a channel is mapped to a multicast group Internet Protocol (IP) address via the Internet Group Management Protocol (IGMP) (i.e., switched multicast is mapped to IP multicast). An embodiment of the present invention is directed to enable switched unicast in an Internet Protocol television system. This may be utilized for targeted advertisement, and other personalized content (e.g., interactive web content overlaid with video content), in which Internet Protocol television based services may be targeted to an individual subscriber using the multicast group IP address combined with a unique data over cable service interface specification (DOCSIS) downstream service identifier (DSID). The multi system/service operators (MSOs) thereby gain flexibility in providing content in order to benefit the multi system/service operators themselves, subscribers, content providers, and advertisers, etc.

Figure 1:
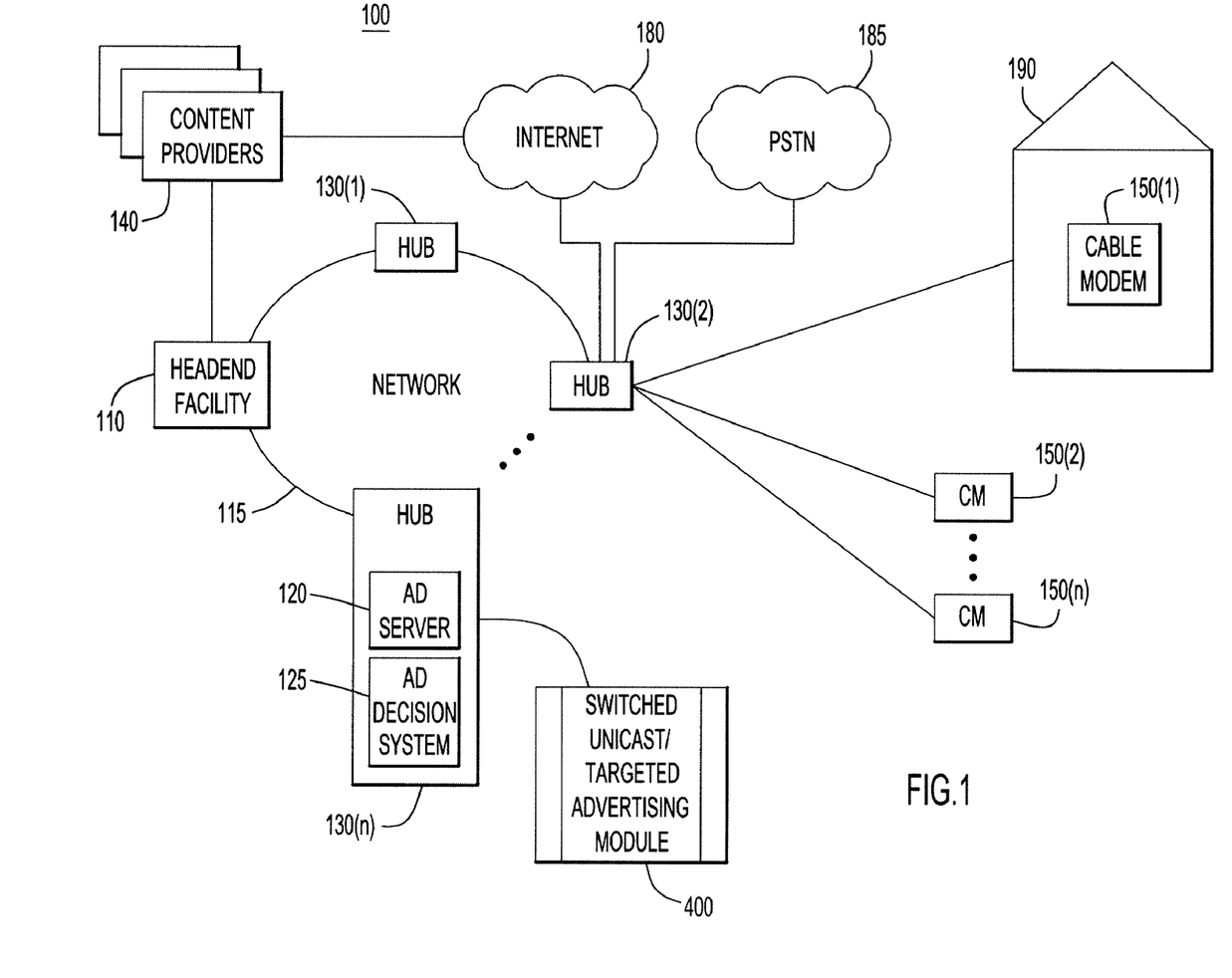
FIG. 1 is a block diagram of an example Internet Protocol television distribution system employing switched unicast in accordance with an embodiment of the present invention.

Referring to FIG. 1, an example Internet Protocol television distribution system or network 100 employing switched unicast in accordance with an embodiment of the present invention is shown. Specifically, system 100 includes a headend facility (HEF) 110, a network 115, a plurality of hubs 130(1)-130(n), and a plurality a cable modems (CMs) 150 (1)-150(n) with CM 150(1) residing in a customer premise 190.

HEF 110 is connected to various content providers 140 for providing media content (e.g., movies, television channels, etc.). The media content is distributed by HEF 110 to hubs 130 via network 115 (e.g. a synchronous optical network (SONET), synchronous digital hierarchy (SDH) network, or IP network). The content is further distributed by hubs 130 to plurality of CMs 150 in the form of conventional switched digital video or Internet Protocol television.

In conventional (non-IPTV) switched digital video, video (and audio) is encoded according to a video codec (e.g., MPEG-4 Advanced Video Coding (AVC)/Scalable Video Coding (SVC), Advanced Video Coding Standard (AVS), Video Codec One (VC-1), etc.) and encapsulated in a transport stream (e.g., an MPEG-2 transport stream (TS)), and transmitted when requested. However, in Internet Protocol television, the video is IP encapsulated after transport in a transport stream (e.g., an MPEG-2 transport stream). In other words, conventional switched digital video is broadcast using traditional broadcast cable technologies, while Internet Protocol television is delivered in a manner similar to that for computer network technologies.

Hubs 130 may each comprise an ad server 120 for storing advertisements, media content, and other data and an ad decision system 125 for determining media content selection. Each of hubs 130 is also connected to Internet 180 and public switched telephone network (PSTN) 185 for providing Internet and telephony services (e.g., to and from customer premise 190). Media content may also be distributed by content providers 140 via Internet 180. One or more hubs 130 may each implement switched unicast and corresponding applications (e.g., targeted advertising) or include a switched unicast/targeted advertising module 400 in accordance with an embodiment of the present invention. Although ad server 120 and switched unicast/targeted advertising module 400 are shown in connection with hub 130(n), these components can reside anywhere on network 115 (e.g., at HEF 110 or other hubs).

Ad server 120 may be a cable industry type media server (or other media system) that includes processors, memory, data storage elements, etc. (not shown), and configured to deliver on-demand media content. The media content may be compressed audio and video encapsulated in an MPEG-2 transport stream for conventional (non-IPTV) switched digital video applications or encapsulated using IP, a transport layer protocol, and an application layer protocol (e.g., real time protocol (RTP), etc.) for Internet Protocol television services. Ad server 120 may also be configured to condition the media content for seamless splicing as described below.

CMs 150 are typical cable industry devices that act as a bridge between the cable network and the home network (not shown) for providing data services (e.g., Internet, telephony, Internet Protocol television services, etc.). CM 150(1) is preferably DOCSIS/EuroDOCSIS compliant (version 3.0 or greater). DOCSIS 3.0 implements a DOCSIS downstream service identifier (DSID) that allows a service provider to further distinguish content. Content delivered to CM 150(1) is labeled with a unique DSID. CM 150(1) is informed of the DSID and filters content based on the DSID (i.e., CM 150(1) may ignore content not labeled with the DSID). It will be appreciated that other CMs throughout system 100 may not be DOCSIS 3.0 compliant.

Figure 2:
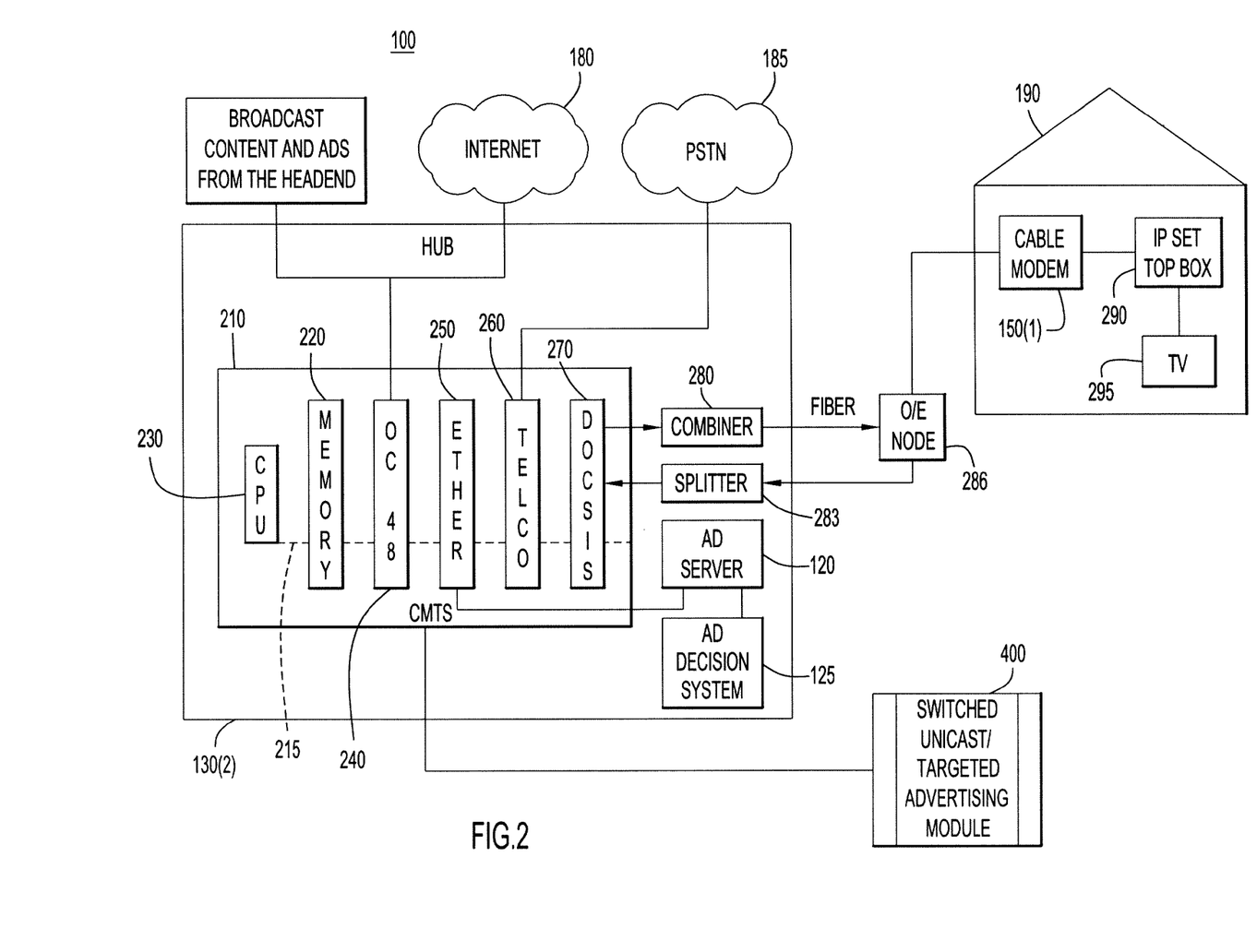
FIG. 2 is a block diagram of a hub within the system of FIG. 1 with a cable modem termination system (CMTS) that is configured to perform switched unicast in accordance with an embodiment of the present invention.

Referring to FIG. 2, customer premise 190 further houses an IP set top box 290 coupled to CM 150(1) and a television (TV) 295. CM 150(1) may also connect to a local area network (LAN, not shown). The LAN may connect to other wired/wireless devices (e.g., personal computers (PCs) or personal data assistants (PDAs), etc.) and may serve as a gateway or access point through which additional PCs or consumer devices have access to data network facilities and Internet Protocol television services (e.g., with targeted content). IP set top box 290 receives media content over IP and de-encapsulates the media content. IP set top box 290 further decrypts and decodes the media content to produce analog video (e.g., component video, composite video, etc.) and analog audio, or digital video/audio (e.g., digital video interface (DVI) signals) for transmission to TV 295.

Hub 130(2) further contains a cable modem termination system (CMTS) 210, a combiner 280, and a splitter 283. Combiner 280 combines various analog and digital signals for transport to customer premise 190 via an optical/electrical (O/E) node 286. Splitter 283 splits the signal coming from O/E node 286 into various components. O/E node 286 communicates via optical fiber to hub 130(2) and via coaxial (coax) cable to customer premise 190 in a hybrid fiber coax (HFC) network. O/E node 286 may reside anywhere between hub 130(2) and customer premise 190, or alternatively, coax may connect hub 130(2) to customer premise 190 without using optical fiber.

The coax cable may be split by a splitter (not shown) at customer premise 190 and routed to other set top boxes including legacy set top boxes that may not be IP capable. These legacy set top boxes may be distributed throughout system 100 and affect available bandwidth within the system. For example, a legacy set top box may not be able to decode an MPEG-4 AVC video stream which requires about half the bandwidth of an MPEG-2 video stream.

CMTS 210 is used to provide high speed data services including cable Internet, voice over IP (VoIP), and Internet Protocol television services to various subscribers. CMTS 210 comprises a central processing unit (CPU) 230 and a memory unit 220 for implementing switched unicast for Internet Protocol television, as described below. CMTS 210 may also house an optical carrier unit 240, Ethernet unit 250, a Telco interface unit 260, and a DOCSIS 3.0 (or greater) unit 270. Memory unit 220 stores data and/or software or processor instructions that are executed to carry out the embodiments of the present invention described herein (e.g., for implementing switched unicast functions of switched unicast/targeted advertising module 400). Memory unit 220 may be separate or a part of CPU 230 or a combination thereof.

Units 220-270 may be circuit cards with embedded software or firmware that plug into a common chassis and communicate over a common bus 215 (e.g., a peripheral component interconnect (PCI) bus), or units 220-270 may be implemented by any conventional or other computer systems preferably equipped with a processor, memories and/or internal or external communications devices (e.g., modem, network cards, etc.).

The firmware or software for units 220-270 may be updated locally or remotely using various networking components. In addition, the software for the present invention embodiments (e.g., the switched unicast/targeted advertising module 400, etc.) may be available on a recordable medium (e.g., magnetic, optical, floppy, DVD, CD, etc.), or in the form of a carrier wave or signal for downloading from a source via a communication medium (e.g., bulletin board, network, WAN, LAN, Intranet, Internet, etc.)

Optical carrier unit 240 may communicate with HEF 110 or Internet 180 over network 115 using one of various SONET, SDH, or other protocols, such as OC-48 or OC-192 (in the U.S. and Canada), and STM-16 or STM-64 (outside of the U.S. and Canada). Ethernet unit 250 is used for communication with local networking components (not shown), and in one example embodiment with ad server 120. Telco unit 260 converts VoIP from customer premise 190 to analog signals for transmission over PSTN 185. DOCSIS unit 270 is CMTS 210 interface to CM 150(1) for digital data signals communicated between CMTS 210 and IP set top box 290.

Any hub in system 100 may include a CMTS provisioned to implement a switched unicast and/or targeted advertising module and may be configured in a manner similar to hub 130(2).

Figure 3:
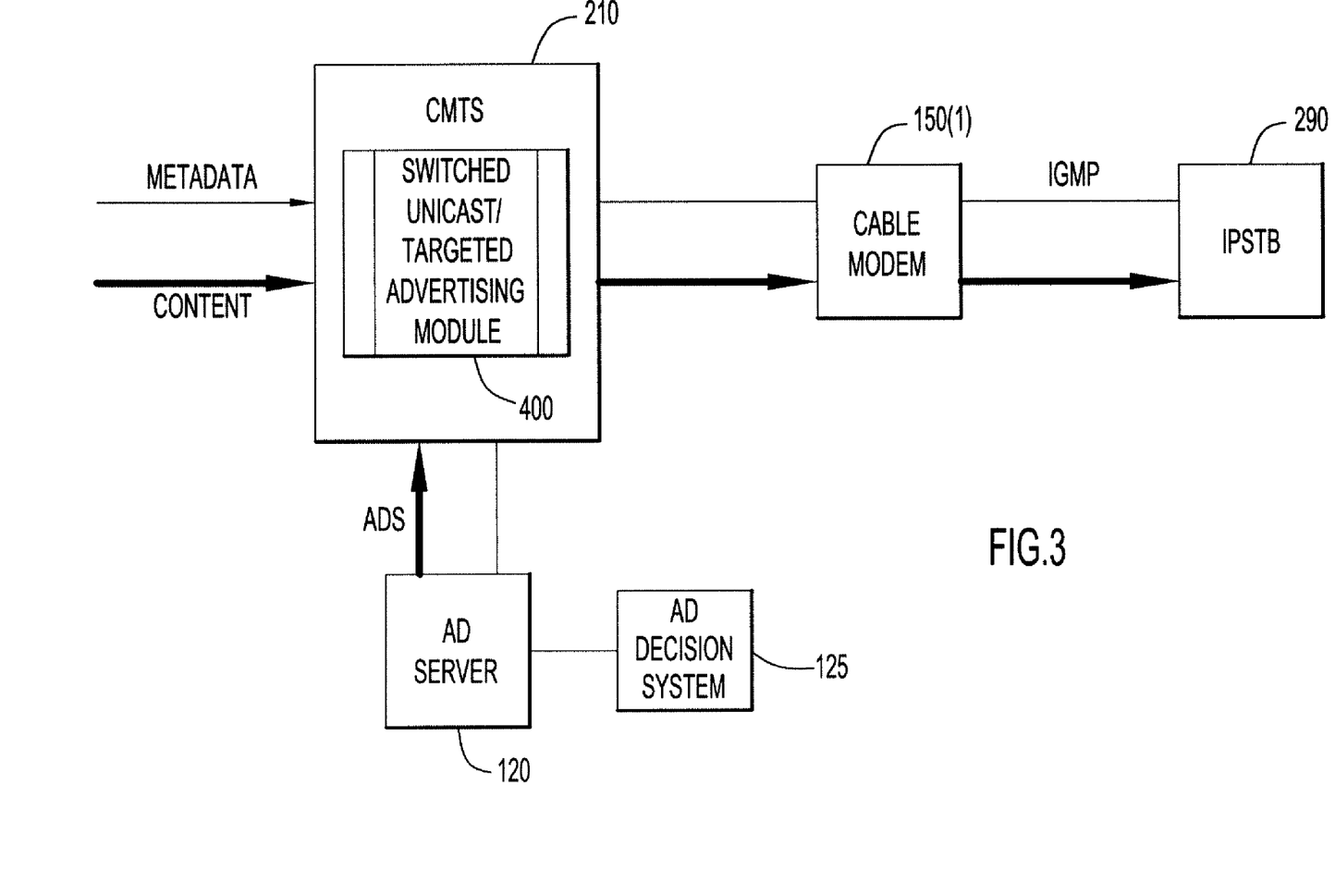
FIG. 3 is a block diagram of an example Internet Protocol television environment portion that is configured to perform switched unicast with targeted advertising in accordance with an embodiment of the present invention.

Referring to FIG. 3, implementation of switched unicast in an Internet Protocol television (IPTV) environment comprises CMTS 210 (with switched unicast module 400), CM 150(1), and IP set top box 290, as described above. The environment may further include ad Server 120 for targeted advertising and ad decision system 125 as described above. The communications path from CMTS 210 to CM 150(1) is frequently referred to as the "last mile" or "DOCSIS last mile" indicating the final communications leg between the service provider and the customer. The DOCSIS last mile may be longer or shorter than a mile and is generally the point where the service provider has the last opportunity to configure services to a particular subscriber (e.g., via CMTS 210 to IP set top box 290). Content and advertisement data flows are shown as thick arrows, while metadata and other communications are shown as thin arrows. The thickness of the arrows generally indicates that content is more bandwidth intensive than metadata.

As described in detailed examples below, DOCSIS 3.0 IPTV service flows are delivered by a CMTS using multicast groups. A unicast delivery of the service flow may be achieved within the multicast group by the CMTS by adding a unique (i.e., unique to a particular IP set top box) DOCSIS downstream service identifier (DSID) to the service flow. The CMTS informs the subscriber's cable modem and labels the service flow with the DSID. The subscriber's cable modem filters by DSID, whereby a unicast service flow from the CMTS to the IP set top box is achieved. The CMTS may dynamically determine whether to provide zone based (or other) or unicast delivery based on various factors (e.g., bandwidth utilization, set top box characteristics, channel targeting capability, etc.).

In general, an electronic program guide (EPG) or other data structure (not shown) is provided to IP set top box 290. The electronic program guide associates media content with an IP multicast address in order for IP set top box 290 to request Internet Protocol television services via an IGMP request. For example, a service flow may be assigned a multicast IP address of M.X.Y.Z, where M is a multicast compliant byte, and X, Y, and Z ranges from 0 to 255. HEF 110 (FIG. 1) may assign an IP address to the metadata (e.g., splicing point information) that is easy to locate (e.g., by adding to or subtracting from the service flow IP address a fixed length digit). In one example, if the service flow is assigned an IP address of 230.11.11.11, then the service flow metadata IP address could merely be incremented to produce a service flow metadata IP address of 230.11.11.12. The method for assigning the metadata IP address is known to both HEF 110 and CMTS 210.

The IGMP request can be understood using a simplified notation in the form of (Source, Group) or (S, G), where the Source is the requested service and the Group is the multicast group IP address associated with the Source. When a subscriber tunes to the service flow, IP set top box 290 sends an IGMP request using exclude mode of (*, 230.11.11.11), with * indicating an empty source list. At this point the Source is empty because IP set top box 290 only knows the multicast IP address from the EPG. Once CMTS 210 receives the (*, 230.11.11.11) IGMP request, it maps the video source to the multicast group IP address (e.g., (service flow, 230.11.11.11)).

For switched unicast, a set top box still signals (*, G) to the CMTS and the CMTS still maps a multicast service flow (Source) with (S, G). In the DOCSIS last mile one could have multiple copies of same (S, G), but on different frequencies. However, within any DOCSIS MAC domain each (S, G) stream can be further identified in DOCSIS 3.0 using a unique DOCSIS downstream service identifier (DSID). A DOCSIS 3.0 cable modem uses the DSID to filter and receive the multicast stream, thereby receiving a unique (i.e., unicast) service flow. This unicast delivery is transparent to the client set top box which issues the IGMP request to access a channel.

Zone based multicast may be achieved without the CMTS performing the multicast to unicast mapping if one can use (S1, G), (S2, G) ... (Sn, G) to represent multiple copies of the stream and statically configure the (S, G) mapping to the set top box based on the set top box's zone. However, this method has several drawbacks. First, this method is not easy to implement in a dynamically determined demographically based zone when the EPG is tied to the zone. Second, this method is not easily managed when the number of zones increases. Lastly, having the fixed channel to (S, G) mapping will not allow the CMTS to re-direct the set top box to a shared stream when bandwidth is not available within the system. Embodiments of the present invention help alleviate or avoid the above problems by adding a layer of granularity by using the DSID to subdivide subscribers into the desired zones.

When a subscriber tunes to a channel (service flow), IP set top box 290 sends an IGMP message to CMTS 210 via CM 150(1) requesting membership in the channel's multicast group (e.g., (*, 230.11.11.11)). CMTS 210 joins the requested service flow and the associated metadata to the multicast group IP address 230.11.11.11 (if CMTS 210 had not previously done so for another subscriber in the service group). IP set top box 290 filters (i.e., "listens to") multicast IP address 230.11.11.11 via CM 150(1).

In one example embodiment, CMTS 210 can further identify the service flow to CM 150(1) using a unique DSID in order to provide a unicast service flow to IP set top box 290. CMTS 210 assigns the unique DSID to CM 150(1) and also labels the service flow with the DSID. CM 150(1) listens to the service flow and filters by DSID. CM 150(1) forwards the service flow to IP set top box 290 when the service flow DSID matches the DOCSIS downstream service identifier assigned by CMTS 210 to CM 150(1).

With respect to targeted advertising, the metadata associated with a service flow comprises, among other things, splice outpoints and inpoints. A splice outpoint is a place in time when the programming stream switches to a different stream (e.g., an advertisement). A splice inpoint is a place in time when the advertising stream is switched back to the programming stream (e.g., the service flow). Problems arise when the advertisement does not "fit" between the outpoint and inpoint, and certain data in the MPEG-2 transport stream must be adjusted.

The MPEG stream headers contain, among other things, a presentation time stamp (PTS) that tells a decoder when to display (i.e., present) a video/audio frame. The PTS values are time events that are relative to a system time clock (STC) that is transmitted in a program clock reference (PCR) field of the headers. These system time clocks can drift from device to device and from encoder to decoder, and may already be embedded in a pre-recorded transport stream. The decoder uses the PCRs to synchronize its clock with the encoder clock. The decoder decodes at a constant bit rate, while the encoder encapsulates variable bit rate information. The encoder uses a video buffering verifier (VBV) model to ensure the variable rate information can be decoded properly.

Unwelcome video and audio effects for the customer may be avoided by pre-conditioning the video streams (both the programming and advertisement streams). Ad server 120 may massage ad content at the beginning and the end to make it suitable for seamless (i.e., an unbroken sequence of frames) splicing. Optionally, a pre-defined VBV level and bitrate are used during encoding to pre-condition the stream. Pre-conditioning allows for minimal processing at the splice points (i.e., the PTS and PCR timestamps may need to be adjusted). Optionally, for non-seamless splicing, an unconditioned advertisement may be shortened to fit between the outpoint and inpoint, or for a short advertisement null packets may be used to fill any gaps in the stream.

As described above, in DOCSIS 3.0, IPTV service flows are delivered by a CMTS using multicast groups. A unicast service flow may be achieved by the CMTS by adding a unique (i.e., unique to a particular IP set top box) DOCSIS downstream service identifier (DSID) to the service flow. The CMTS can then create the unicast flow to a particular IP set top box (subscriber). When splice points are detected in the service flow then the CMTS can select a targeted advertisement for splicing into the unicast flow. The CMTS may have information about subscribers and a policy or rule base used to select an advertisement or other personalized content for a subscriber based on subscriber information. Selection of content may be implemented by a decision system (e.g., an ad decision system 125). The ad decision system 125 is shown as a dedicated system component communicating with the ad server 120. As alternative, the ad decision system can be embedded in the ad server or even the CMTS. The ad decision system informs a device or content server (e.g., an ad server) about the selected advertisement. The ad server then streams the selected content at the appropriate time. Although ad selection is discussed in conjunction with the CMTS, ad selection may occur in other parts of the system (e.g., at the ad server).

Figure 4:
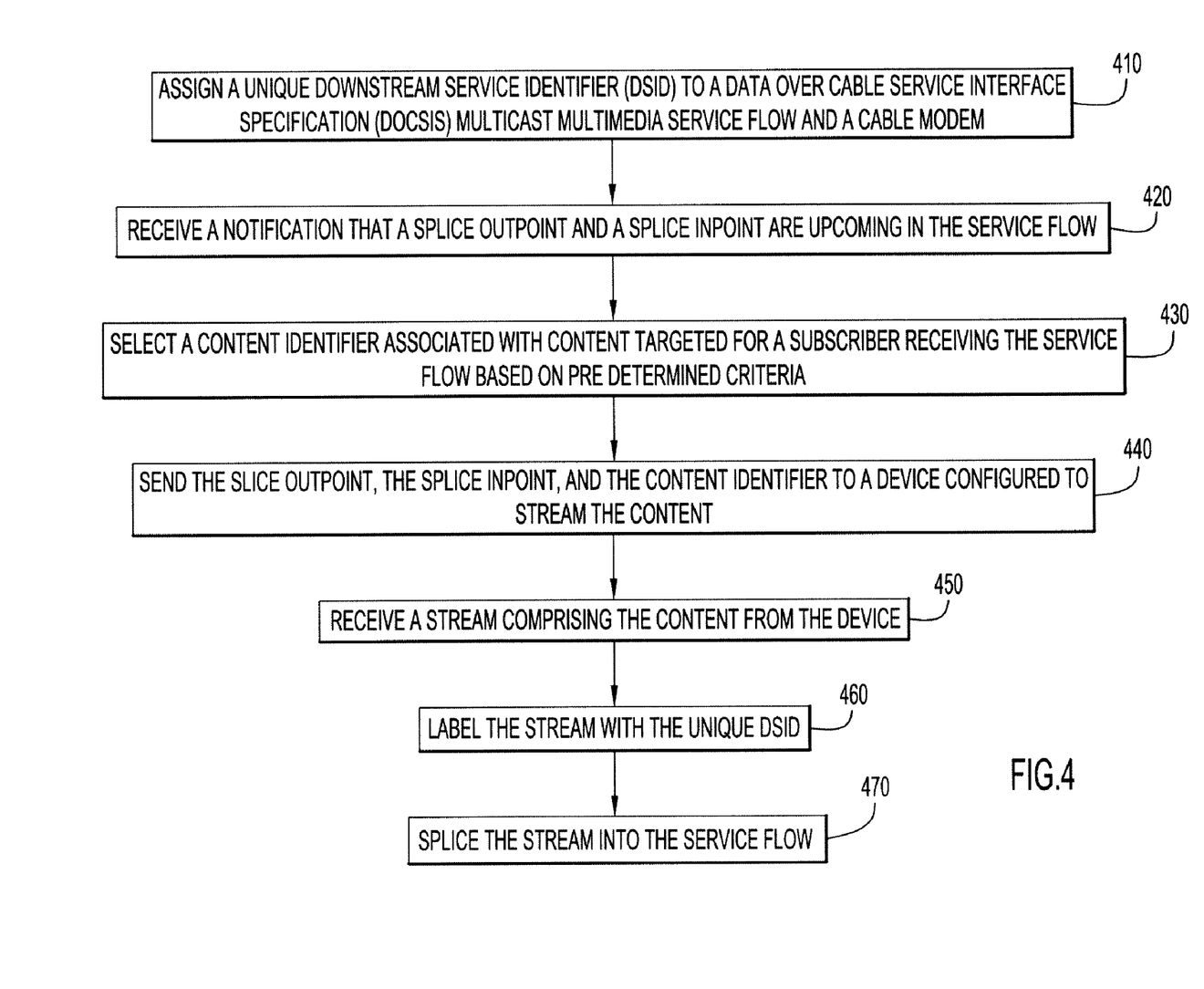
FIG. 4 is an example procedural flowchart illustrating the manner in which advertising is targeted to subscribers in accordance with an embodiment of the present invention.

An application of switched unicast for targeted advertising is accomplished by CMTS 210 using switched unicast/targeted advertising module 400 as described with reference to FIG. 4. A set top box initially sends an IGMP request to CMTS 210 to access a channel, and the CMTS 210 joins the channel multicast and the metadata multicast. A unique DOCSIS downstream service identifier is assigned to a DOCSIS multicast multimedia service flow and to a cable modem at step 410, where the service flow is labeled with the unique DSID and the cable modem is notified to filter the service flow based on the DSID. A notification is received that a splice outpoint and splice inpoint are upcoming in the service flow at step 420. The subscriber information and the splicing information are sent to the ad decision system/module. A content identifier associated with content targeted for a subscriber receiving the service flow is selected by the ad decision system/module 125 based on predetermined criteria at step 430. For an individual subscriber associated with a particular IP set top box, content may be an advertisement selected based on predetermined criteria that may include the subscriber's demographic data, the subscriber's preferences, the subscriber's behavior (e.g., viewing habits), and the like. For subscribers assigned to a group, an advertisement may be selected based on demographic zone, in which a number of subscribers are grouped by demographics, by geographic zone in which a number of subscribers are grouped by geographic area, and the like. One or more advertisements can be identified and placed in a priority list, and used when the primary selection cannot be added to the service flow.

The splice outpoint, the splice inpoint, and the content identifier are sent to ad server 120 configured to stream the content at step 440, where the content identifier identifies the content to ad server 120, the splice outpoint signals a time to start streaming the content, and the splice inpoint signals a time to stop streaming the content. Alternately, the ad server 120 may include or communicate with ad decision system 125 that selects an ad based on the IP address of the set top box and placement ad information, and provides the content identifier for the selected ad. It will be appreciated that the sending feature may be in the form of a database query requesting ad server 120 to stream the content (e.g., a structured query language (SQL) query may be made to a relational database residing on ad server 120). In one embodiment, metadata is also sent to ad server 120 and may comprise the PTS timestamps, PCR timestamps, VBV level, and/or IP set top box's 290 IP address. Ad server 120 may use the metadata to precondition the advertisement and/or encapsulate content for IP set top box 290. For example, the ad content may be massaged at the beginning and end to make it suitable for seamless splicing. If the ads are already preconditioned, the PTS and PCR can be adjusted, or the ads may be cut and fitted with null packets. A stream comprising the content is received from ad server 120 at step 450. The stream is labeled with the unique DSID at step 460 and the stream is spliced into the service flow at step 470. Thus, the combination of the IP multicast stream and unique DSID produce a unicast stream that can be targeted to an individual subscriber. When the multicast stream is received by CM 150(1) it filters the stream by DSID to obtain the unicast stream and forwards the unicast stream to IP set top box 290. IP set top box 290 decodes the unicast stream for TV 295 to present the targeted advertisement to the subscriber.

When a subscriber tunes to a different program (e.g., ABC), IP set top box 290 looks up the IP address of the program in the electronic program guide and sends an IGMP message with the IP address to CMTS 210. CMTS 210 joins the program to the multicast group and the above steps are repeated.

It will also be appreciated that switched unicast/targeted advertising module 400 may be used to form groups of subscribers within a multicast group. The mappings between multicast groups and assigned DSIDs may be changed dynamically in order to optimize bandwidth between CMTSs and CMs. Since the unicast delivery of the content requires more bandwidth than the multicast delivery, the CMTS has multiple options to handle the switched unicast in time of bandwidth shortage. For example, when the bonding groups the CM is currently tuned to do not have enough bandwidth for the unicast delivery, the CMTS can load balance the CM to other bonding groups that have enough bandwidth for the unicast delivery.

In another example embodiment, the CMTS can dynamically determine whether to use multicast or switched unicast. For example, the available bandwidth is determined for the subscribers tuned to the programming stream before assigning a DSID to a particular multicast flow and CM. The available bandwidth determines how many times the program stream can be subdivided, and thus, how many individual streams or groups of streams are available for targeted advertising. If bandwidth is available for an individual subscriber (i.e., an IP set top box), a DSID is assigned that is unique to that individual subscriber, and that DSID is subsequently used to label the DOCSIS multicast flow streamed to the individual subscriber, thereby implementing switched unicast. If bandwidth is not available, zone or other multicast is used where a duplicate DSID may be assigned to the subscribers. The subscriber becomes part of a group that shares a multicast stream and DSID (i.e., zone based), and thereby, bandwidth is conserved. The CMTS can select a source of the multicast based on the ad zone of the set top box, current bandwidth utilization, channel type, and/or other relevant criteria.

Advertisement selection and DOCSIS downstream service identifier assignment may also be based on the channel characteristics. The channel characteristics may include the channel's popularity, the availability of local advertising, etc. Advertisement selection is then based on advertiser preferences, revenue modeling, or other non-subscriber or non-bandwidth considerations. In other situations, the network will not allow for local ad insertion for a particular channel. In that case there is no benefit to using unicast delivery and multicast delivery should be used to conserve bandwidth.

It will be appreciated that the embodiments described above and illustrated in the drawings represent only a few of the many ways of implementing switched unicast in an Internet Protocol television environment.

The environment of the present invention embodiments may include any quantity of headend facilities and systems, hubs, cable modem termination systems, cable modems, set top boxes, and multimedia/database systems or servers (e.g., media systems, ad servers, ad decision systems, etc.). The functions of the headend systems, hubs, CMTSs, cable modems, subscriber devices, and multimedia systems employed by the present invention embodiments may be implemented and/or performed by any quantity of any personal or other type of computer system (e.g., IBM-compatible, Apple, Macintosh, laptop, rack or cluster systems, palm pilot, etc.) or processing device (e.g., microprocessor, controller, circuitry, etc.), and may include any commercially available operating system (e.g., Windows, OS/2, Unix, Linux, etc.) and any commercially available or custom software (e.g., browser software, communications software, server software, switched unicast/targeted advertising module, ad decision module, logic, etc.). These systems may include any types of monitors and input devices (e.g., keyboard, mouse, voice recognition, etc.) to enter and/or view information.

The databases may be implemented by any quantity of any type of conventional or other databases (e.g., relational, hierarchical, etc.) or storage structures (e.g., files, data structures, disk or other storage, etc.). The databases may store any desired information arranged in any fashion (e.g., tables, relations, hierarchy, etc.).

The queries may be of any quantity or type and request any type of database or other operation. The queries may include any desired format and may be directed toward any conventional or other database or storage unit.

It is to be understood that the software (e.g., switched unicast/targeted advertising module, ad decision module, logic) for the computer systems and/or processing devices of the present invention embodiments (e.g., headend systems, hubs, CMTSs, servers, subscriber devices, ad server, ad decision system, cable modems, etc.) may be implemented in any desired computer language (e.g., ADA, C, C++, C#, Java, etc.) and could be developed by one of ordinary skill in the computer arts based on the functional descriptions contained in the specification and flow charts illustrated in the drawings. Further, any references herein of software performing various functions generally refer to computer systems or processors performing those functions under software control.

Furthermore, the software of the present invention embodiments may be available on a recordable medium (e.g., magnetic or optical mediums, magneto-optic mediums, floppy diskettes, CD-ROM, DVD, memory devices, etc.) for use on stand-alone systems or systems connected by a network or other communications medium, and/or may be downloaded (e.g., in the form of carrier waves, packets, etc.) to systems via a network or other communications medium.

The computer systems and/or processing devices of the present invention embodiments may alternatively be implemented by any type of hardware and/or other processing circuitry. The functions of the computer systems and/or processing devices may be implemented by logic encoded in one or more tangible media (e.g., embedded logic such as an application specific integrated circuit (ASIC), digital signal processor (DSP) instructions, software that is executed by a processor, etc.). Thus, functions of the computer systems and/or processing devices may be implemented with fixed logic or programmable logic (e.g., software/computer instructions executed by a processor) by way of a programmable processor, programmable digital logic (e.g., field programmable gate array (FPGA)) or an ASIC that comprises fixed digital logic, or a combination thereof.

The various functions of the computer systems and/or processing devices of the present invention embodiments may be distributed in any manner among any quantity of software and/or modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the headend systems, hubs, CMTSs, cable modems, subscriber devices, and multimedia systems (e.g., ad server, ad decision system, etc.). The software and/or algorithms described above and illustrated in the flow charts may be modified in any manner that accomplishes the functions described herein. In addition, the functions in the flow charts or description may be performed in any order that accomplishes a desired operation.

The communication networks may be implemented by any quantity of any type of communications network (e.g., LAN, WAN, Internet, Intranet, VPN, etc.). The computer systems of the present invention embodiments (e.g., headend systems, hubs, CMTSs, and subscriber devices, etc.) may include any conventional or other communications devices to communicate over the networks via any conventional or other protocols. The computer systems (e.g., headend systems, hubs, CMTSs, servers, and subscriber devices, etc.) may utilize any type of connection (e.g., wired, wireless, etc.) for access to the network. The communication over the communication networks may be implemented by any quantity of any type of communications protocol (e.g., TCP/IP, SONET, MAC, ATM, IP/Ethernet over WDM, etc.) operable within or outside the OSI model.

The present invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

It is to be understood that the present invention embodiments are not limited to the applications disclosed herein, but may be utilized for any suitable for uniquely identifying data streams in a mixed protocol environment. Further, the switched unicast/targeted advertising module may reside on any processing device (e.g., headend systems, CMTSs, servers, or any intermediate processing systems between headend systems and CMTSs, etc.) to associate targeted advertisements and other personalized content with a subscriber device (e.g., a cable modem, set top box, PC, etc.).

Advertisement selection, personal content selection, and DOCSIS downstream service identifier assignment may be based on subscriber data, bandwidth considerations, and channel characteristics, among others. Therefore, ad selection, personal content selection, and DOCSIS downstream service identifier assignment maybe based on a particular IP set top box, a subscriber's demographic or geographic data, the subscriber's preferences, the subscriber's behavior, bandwidth limitations, the channel's popularity, and/or the availability of advertising, or any combination of, but not limited to, the above. Subscribers (IP set top boxes) may be grouped or zoned in any manner or combination according to multicast group IP address and/or DOCSIS downstream service identifier.

From the foregoing description, it will be appreciated that the invention makes available a novel method and apparatus for switched unicast in an Internet Protocol television environment, wherein a system and method enable a cable system operator or MSO in an IP multicast DOCSIS environment may target multimedia content to a single subscriber device (e.g., a cable modem, set top box, PDA, etc.).

Having described preferred embodiments of a new and improved switched unicast in an Internet Protocol television environment, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A method comprising:
receiving a plurality of service flows from at least one content source within an Internet Protocol television (IPTV) system at a processing device coupled to at least one subscriber device;
processing multicast service flow requests from said at least one subscriber device within said Internet Protocol television (IPTV) system by mapping a service flow from a content source to a multicast service flow based on a multicast service flow request from a particular subscriber device and assigning a unique identifier to said mapped multicast service flow to convert said mapped multicast service flow to a unicast delivery of said mapped multicast service flow to said particular subscriber device;
inserting content specific to said particular subscriber device into said mapped multicast service flow at said processing device for unicast delivery to said particular subscriber device; and
receiving at a cable modem associated with said particular subscriber device said mapped multicast service flow including said specific content from said processing device and providing said mapped multicast service flow including said specific content to said particular subscriber device in response to said unique identifier corresponding to said particular subscriber device.

2. The method of claim 1, wherein said inserting content further includes:
sending a request to a media system for media content, wherein said media system sends media content determined by a decision system and associated with said particular subscriber device; and
receiving said determined media content at said processing device and inserting said received media content into said mapped multicast service flow for unicast delivery to said particular subscriber device.

3. The method of claim 1, further including:
assigning a unique identifier to said mapped multicast service flow for a group of subscribers to stream said mapped multicast flow to said group of subscribers, wherein said group of subscribers is formed based on subscriber characteristics including at least one of subscriber geographic placement, subscriber demographic placement, or subscriber attributes.

4. The method of claim 3, further including:
examining at least one of network conditions or said subscriber characteristics; and
providing said mapped multicast service flow in said mapped multicast delivery to said group of subscribers or said unicast delivery to said particular subscriber device based on said conditions and/or said characteristics.

5. The method of claim 1, wherein said providing said mapped multicast service flow further includes:
filtering said mapped multicast service flow for an identifier associated with said particular subscriber device; and
providing said mapped multicast service flow to said particular subscriber device in response to said unique identifier corresponding to said identifier associated with said particular subscriber device.

6. The method of claim 2, wherein said sending a request to said media system comprises sending a splice outpoint and a splice inpoint indicating to said media system when to start and stop streaming said determined media content to said processing device, and wherein said receiving said determined media content comprises inserting into said mapped multicast service flow said determined media content between said splice outpoint and said splice inpoint.

7. The method of claim 2, further including:
conditioning a beginning and an end of said determined media content for insertion into said mapped multicast service flow between a splice outpoint and a splice inpoint for seamless unicast delivery to said particular subscriber device.

8. An apparatus comprising:
a processing device coupled between at least one content source and at least one subscriber device within an Internet Protocol television (IPTV) system to receive a plurality of service flows from said at least one content source and to process multicast service flow requests from said at least one subscriber device, wherein said processing device includes:
a map module to map a service flow from a content source to a multicast service flow based on a multicast service flow request from a particular subscriber device;
a unicast module to assign a unique identifier to said mapped multicast service flow to convert said mapped multicast service flow to a unicast delivery of said mapped multicast service flow to said particular subscriber device; and
a content module to insert content specific to said particular subscriber device into said mapped multicast service flow for unicast delivery to said particular subscriber device; and
a cable modem associated with said particular subscriber device to receive said mapped multicast service flow including said specific content from said processing device and to provide said mapped multicast service flow including said specific content to said particular subscriber device in response to said unique identifier corresponding to said particular subscriber device.

9. The apparatus of claim 8, further including:
a media system to receive a request from said processing device, determine media content associated with said particular subscriber device, and provide said determined media content to said processing device for insertion into said mapped multicast service flow for unicast delivery to said particular subscriber device.

10. The apparatus of claim 8, wherein said processing device further includes:
a zone multicast module to assign a unique identifier to said mapped multicast service flow for a group of subscribers to stream said mapped multicast flow to said group of subscribers, wherein said group of subscribers is formed based on subscriber characteristics including at least one of subscriber geographic placement, subscriber demographic placement, or subscriber attributes.

11. The apparatus of claim 10, wherein said processing device further includes:
a delivery module to examine at least one of network conditions or said subscriber characteristics and provide said mapped multicast service flow in said mapped multicast delivery to said group of subscribers or said unicast delivery to said particular subscriber device based on said conditions and/or said characteristics.

12. The apparatus of claim 8, wherein said
cable modem associated with said particular subscriber device is configured to:
filter said mapped multicast service flow for an identifier associated with said particular subscriber device; and
provide said mapped multicast service flow to said particular subscriber device in response to said unique identifier corresponding to said identifier associated with said particular subscriber device.

13. The apparatus of claim 9, wherein said media system receives a splice outpoint and a splice inpoint from said processing device indicating to said media system when to start and stop streaming of said determined media content to said processing device, and wherein said processing device inserts said determined media content between said splice outpoint and said splice inpoint.

14. The apparatus of claim 9, wherein said processing device further includes:
a splice module to condition a beginning and an end of said determined media content for insertion into said mapped multicast service flow between a splice outpoint and a splice inpoint for seamless unicast delivery to said particular subscriber device.

15. Logic encoded in one or more tangible media for execution by a processing device and when executed operable to:
receive a plurality of service flows from at least one content source within an Internet Protocol television (IPTV) system;
process multicast service flow requests from at least one subscriber device within said Internet Protocol television (IPTV) system by mapping a service flow from a content source to a multicast service flow based on a multicast service flow request from a particular subscriber device, and assigning a unique identifier to said mapped multicast service flow to convert said mapped multicast service flow to a unicast delivery of said mapped multicast service flow to said particular subscriber device;
insert content specific to said particular subscriber device into said mapped multicast service flow for unicast delivery to said particular subscriber device; and
receive at a cable modem associated with said particular subscriber device said mapped multicast service flow including said specific content and provide said mapped multicast service flow including said specific content to said particular subscriber device in response to said unique identifier corresponding to said particular subscriber device.

16. The logic of claim 15, wherein said logic operable to insert content comprises logic operable to:
  send a request to a media system for media content, wherein said media system sends the media content determined by a decision system and associated with said particular subscriber device; and
  receive said determined media content at said processing device and insert said received media content into said mapped multicast service flow for unicast delivery to said particular subscriber device.

17. The logic of claim 15, further operable to:
  assign a unique identifier to said mapped multicast service flow for a group of subscribers to stream said mapped multicast flow to said group of subscribers, wherein said group of subscribers is formed based on subscriber characteristics including at least one of subscriber geographic placement, subscriber demographic placement, or subscriber attributes.

18. The logic of claim 17, further operable to:
  examine at least one of network conditions or said subscriber characteristics; and
  provide said mapped multicast service flow in said mapped multicast delivery to said group of subscribers or said unicast delivery to said particular subscriber device based on said conditions and/or said characteristics.

19. The logic of claim 15, wherein said logic operable to provide said multicast service flow comprises logic operable to:
  filter said mapped multicast service flow for an identifier associated with said particular subscriber device; and
  provide said mapped multicast service flow to said particular subscriber device in response to said unique identifier corresponding to said identifier associated with said particular subscriber device.

20. The logic of claim 16, wherein said logic operable to send comprises logic operable to send a splice outpoint and a splice inpoint indicating to said media system when to start and stop streaming said determined media content to said processing device, and wherein said logic operable to receive comprises logic operable to insert into said mapped multicast service flow said determined media content between said splice outpoint and said splice inpoint.

* * * * *